(12) United States Patent
Sakaguchi et al.

(10) Patent No.: US 8,751,126 B2
(45) Date of Patent: Jun. 10, 2014

(54) ACCELERATOR REACTION FORCE CONTROL APPARATUS

(75) Inventors: Shigeyuki Sakaguchi, Yokohama (JP); Masao Shiomi, Sagamihara (JP); Masahiro Omori, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/266,373

(22) PCT Filed: Sep. 1, 2010

(86) PCT No.: PCT/IB2010/002159
§ 371 (c)(1),
(2), (4) Date: Oct. 26, 2011

(87) PCT Pub. No.: WO2011/033353
PCT Pub. Date: Mar. 24, 2011

(65) Prior Publication Data
US 2012/0059563 A1 Mar. 8, 2012

(30) Foreign Application Priority Data
Sep. 18, 2009 (JP) ................................. 2009-216758

(51) Int. Cl.
*B60K 26/02* (2006.01)
*F02D 11/02* (2006.01)

(52) U.S. Cl.
USPC .............................................. 701/70; 701/94

(58) Field of Classification Search
USPC ........................................ 701/36, 70; 74/513
See application file for complete search history.

(56) References Cited

U.S. PATENT DOCUMENTS

| 7,069,801 B2 | 7/2006 | Yone | |
|---|---|---|---|
| 2004/0192504 A1* | 9/2004 | Kumazawa | ................... 477/166 |
| 2005/0056253 A1* | 3/2005 | Yone et al. | ..................... 123/399 |
| 2010/0204883 A1 | 8/2010 | Honda | |

FOREIGN PATENT DOCUMENTS

| JP | 2003-25870 A | 1/2003 |
|---|---|---|
| JP | 2003-120339 A | 4/2003 |
| JP | 2004-314871 A | 11/2004 |

(Continued)

OTHER PUBLICATIONS

A Written Opinion of the International Search Authority for International Application No. PCT/IB2010/002159 mailed Dec. 21, 2010.

(Continued)

*Primary Examiner* — Helal A Algahaim
*Assistant Examiner* — Charles J Han
(74) *Attorney, Agent, or Firm* — Global IP Counselors, LLP

(57) ABSTRACT

An accelerator reaction force control apparatus is provided with an accelerator position detecting device, a reaction force varying device and a threshold value setting device. The reaction force varying device varies a reaction force of the accelerator so as to increase a reaction force of the accelerator by a prescribed increase amount with respect to a base reaction force when the accelerator position is equal to or larger than an accelerator position threshold value. The reaction force varying device also varies a reaction force increase rate at a first increase rate during a first reaction force increase period of the increase of the reaction force, and at a second increase rate during a second reaction force increase period of the increase of the reaction force. The second increase rate is larger during the second reaction force increase period than during the first reaction force increase period.

4 Claims, 6 Drawing Sheets

(56) References Cited

FOREIGN PATENT DOCUMENTS

| | | | |
|---|---|---|---|
| JP | 2005-132225 | A | 5/2005 |
| JP | 2007-76468 | A | 3/2007 |
| JP | 2007-125933 | A | 5/2007 |
| JP | 2007-182196 | A | 7/2007 |
| JP | 2008-201231 | A | 9/2008 |
| JP | 2009-154864 | A | 7/2009 |
| WO | WO 2009/022637 | A1 | 2/2009 |

OTHER PUBLICATIONS

An English translation of the Chinese Office Action for the corresponding Chinese patent application No. 201080028587.7 issued on Dec. 31, 2013.

An English translation of the Korean Notice of Preliminary Rejection of corresponding Korean Application No. 10-2012-7002829, issued on Jun. 24, 2013.

* cited by examiner

| | |
|---|---|
| 1 | VEHICLE BODY |
| 2 | ACCELERATOR PEDAL |
| 3 | ROTARY SHAFT |
| 4 | RETURN SPRING |
| 5 | BEARING |
| 6 | ACCELERATOR POSITION SENSOR |
| 7 | VARIABLE FRICTION PLATE |
| 7a | FRICTION MEMBER |
| 7b | FRICTION MEMBER |
| 8 | STATIONARY SHAFT |
| 9 | ACTUATOR |
| 10 | CONTROL UNIT |
| 11 | ENGINE ROTATIONAL SPEED SENSOR |
| 12 | VEHICLE SPEED SENSOR |
| 20 | SWITCH |

ACCELERATOR REACTION FORCE CONTROL APPARATUS

CROSS-REFERENCE TO RELATED APPLICATIONS

This application is a U.S. National stage of International Application No. PCT/IB2010/002159, filed Sep. 1, 2010, which claims priority to Japanese Patent Application No. 2009-216758, filed on Sep. 18, 2009. The entire disclosure of Japanese Patent Application No. 2009-216758 is hereby incorporated herein by reference.

BACKGROUND

1. Field of the Invention

The present invention generally relates to an accelerator reaction force control apparatus for controlling an operating force of an accelerator of a vehicle.

2. Background Information

An accelerator reaction force control apparatus have been proposed for controlling an operating force (depression reaction force) of an accelerator pedal of a vehicle. An example of such an accelerator pedal reaction force control apparatus is disclosed in Japanese Laid-Open Patent Publication No. 2003-120339. This publication discloses controlling the engine by switching between a first operating method (e.g., homogeneous combustion) used in a high rotational speed/high load region and a second operating method (e.g., stratified combustion) used in a low rotational speed/low load region for a higher fuel efficiency than the first operating method. When an engine operating region changes from a second operating region where the second operating method is used to a first operating region where the first operating method is used, the depression reaction force (reaction force of the accelerator pedal) is suddenly increased at a boundary operating region occurring immediately before the first operating region is entered. Meanwhile, the increase of the reaction force is cancelled when the operating region returns to the second operating region from the boundary operating region.

SUMMARY

One object of the technology disclosed in Japanese Laid-Open Patent Publication No. 2003-120339 is to reduce a fuel consumption rate by increasing the reaction force of the accelerator pedal and canceling the increase of the reaction force of the accelerator pedal by using the aforementioned boundary operating region as a trigger. An accelerator pedal is one example of an operating member enabling a driver to control the speed of a vehicle as desired. The driver operating feel of the accelerator pedal and the effect that the operating feel of the accelerator pedal has on the drivability of the vehicle are significant because they are directly related to how the quality of the vehicle as a whole is evaluated by the driver. Therefore, when attempting to achieve an accelerator operation force control apparatus that can contribute to reducing fuel consumption in actual practice, it is necessary to strike a fine balance between reducing fuel consumption, obtaining good accelerator pedal operating feel, and providing good vehicle operability.

It has been discovered through driving tests of several prototypes having a reaction force control feature that were designed to contribute to reducing fuel consumption. In the course of these tests, it was observed that when the reaction force is increased and decreased (increase cancelled) using an accelerator position as a trigger in the manner of the technology disclosed in Japanese Laid-Open Patent Publication No. 2003-120339, undesirable behavior ultimately occurs due to an involuntary response of a driver.

More specifically, with the technology disclosed in Japanese Laid-Open Patent Publication No. 2003-120339, when a driver depresses the accelerator pedal and the reaction force of the accelerator pedal suddenly increases because the operating region enters the boundary operating region from the second operating region, the accelerator pedal is pushed back toward a smaller depression amount against the intent of the driver. In some cases, the operating region returns to the second operating region from the boundary operating region. In such a case, the reaction force is suddenly decreased by an amount equal to the amount by which the reaction force was suddenly increased when the operating region entered the boundary operating region from the second operating region. Depression of the accelerator pedal brings about an increase of the reaction force followed by a decrease of the reaction force when the operating region again passes through the boundary region. Since the driver's original intent is to continue depressing the accelerator pedal, the driver naturally depresses the accelerator pedal further after the reaction force decreases. As a result, the operating region again enters the boundary operating region from the second operating region and the reaction force is increased suddenly once again. Thus, the accelerator pedal is again pushed back against the intent of the driver.

In short, when a driver increases a position of an accelerator pedal such that the operating region crosses a boundary where the fuel efficiency of the vehicle changes, the accelerator pedal behaves erratically against the intent of the driver. In this event, the driver experiences a feeling that something is odd about the vehicle and the vehicle the operability has degraded.

In view of the above technology and according to one aspect of the present disclosure, an accelerator reaction force control apparatus is provided that comprises an accelerator position detecting device, a reaction force varying device and a threshold value setting device. The accelerator position detecting device detects an accelerator position. The reaction force varying device varies a reaction force of the accelerator so as to increase a reaction force of the accelerator by a prescribed increase amount with respect to a base reaction force when the accelerator position is equal to or larger than an accelerator position threshold value. The threshold value setting device sets the accelerator position threshold value based on at least one of a vehicle operating state and an engine operating state related to a fuel consumption rate. The reaction force varying device is further configured to vary a reaction force increase rate at which the reaction force of the accelerator is increased by the prescribed increase amount beyond the base reaction force. The reaction force increase rate includes a first increase rate that is used during a first reaction force increase period of the increase of the reaction force and a second increase rate that is used during a second reaction force increase period of the increase of the reaction force. The second reaction force increase period is subsequent to the first reaction force increase period. The second increase rate is larger during the second reaction force increase period than during the first reaction force increase period.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
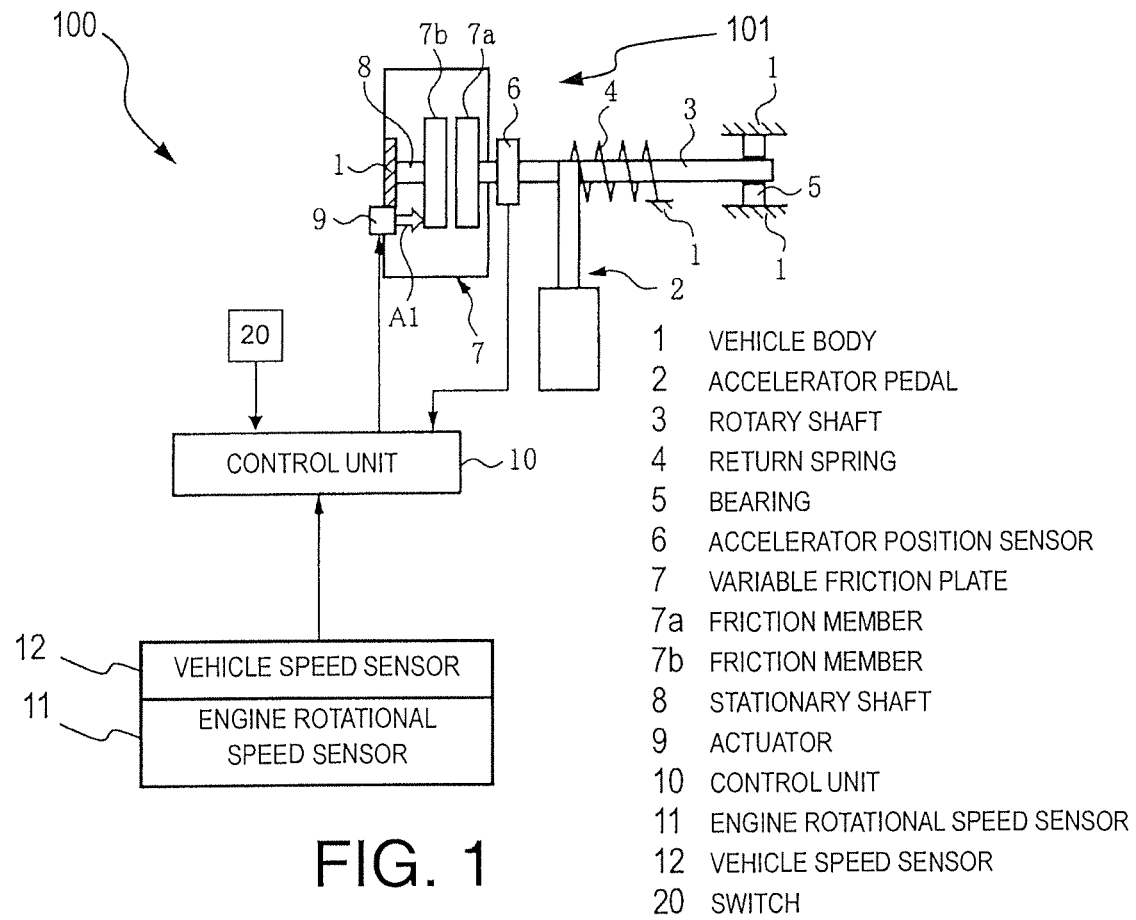
FIG. 1 is a simplified schematic view showing a system configuration and a reaction force changing mechanism of an accelerator pedal reaction force control apparatus according to illustrated embodiments.

Referring initially to FIG. 1, a schematic system diagram of an accelerator reaction force control apparatus 100 is illustrated in accordance with one embodiment. The accelerator reaction force control apparatus 100 is basically configured to variably control a reaction force (operating force) of an accelerator pedal 2 provided in a vehicle body 1 of a vehicle. While the terms "accelerator" and "accelerator pedal" are used throughout this description and the following claims, it should be understood from this disclosure that such terms should not be limited to any particular embodiment or type of input device. In particular, while a "pedal" inside the passenger compartment is described, it should be understood from this disclosure that the "accelerator" can be a device in the engine compartment responsive to electrical, hydraulic or mechanical signals produced by a pedal (or other input device) in the passenger compartment. Additionally, while the device in the passenger compartment is described as a pedal, it should be understood from this disclosure that various other regulating devices (e.g., levers, switches, buttons, etc.) can be used as an "accelerator" or as devices that signal an "accelerator."

As explained below, the accelerator reaction force control apparatus 100 detects a position (depression amount) of the accelerator pedal 2 and changing a reaction force of the accelerator pedal 2 from a base reaction force. In other words, the accelerator reaction force control apparatus 100 is basically configured to variably control a reaction force (operating force) of an accelerator pedal 2 provided in the vehicle body 1. The accelerator reaction force control apparatus 100 includes an accelerator position detecting means or device for detecting an accelerator position (depression amount) of the accelerator pedal 2 and a reaction force varying means or device for changing a reaction force of the accelerator pedal 2 from a base reaction force. Basically, the accelerator reaction force control apparatus 100 is configured to increase the reaction force of the accelerator pedal 2 beyond the base reaction force when the position of the accelerator pedal 2 is larger than a prescribed accelerator position threshold value $\alpha$.

As will be explained later, the accelerator reaction force control apparatus 100 is configured such that when the reaction force of the accelerator pedal 2 is increased beyond the base reaction force, a driver's foot can be prevented from being pushed back due to a sudden increase of the reaction force and degradation of the operability can be suppressed. Also, since the rate at which the reaction force is increased is larger during a second reaction force increase period of the increase than during a first reaction force increase period, the driver can be reliably notified that the fuel efficiency will decline.

Figure 2:
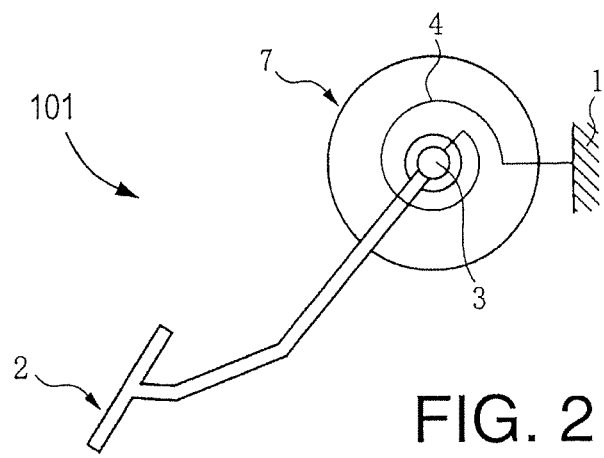
FIG. 2 is a simple schematic view of a reaction force changing mechanism according to the illustrated embodiments.

As shown in FIGS. 1 and 2, the accelerator pedal 2 is provided on a rotating shaft 3 such that the accelerator pedal 2 pivots about a center axis of the rotating shaft 3. A return spring 4 serves to apply a force (reaction force) against the accelerator pedal 2 in a direction of closing a throttle valve (decreasing accelerator position or a depression amount in the case of a pedal). One end of the return spring 4 is fixed to the vehicle body 1, while the other end is fixed to the rotating shaft 3. Each end of the rotating shaft 3 is rotatably supported on the vehicle body 1 with a bearing 5 and an accelerator position sensor 6 is provided near the other end of the rotating shaft 3. The accelerator position sensor 6 serves as an accelerator position detecting means or device and outputs an accelerator position signal APS.

In this embodiment, the operation or depression amount (position) of the accelerator pedal 2 and an opening degree of a throttle valve (not shown) of an internal combustion engine (not shown) are linked such that the opening degree of the throttle valve increases and decreases in accordance with the depression amount of the accelerator pedal 2. Basically, a fuel injection amount (and, thus, a fuel consumption amount) increases and decreases according in accordance with the accelerator position.

As shown in FIGS. 1 and 2, a sketch of a reaction-force changing mechanism 101 is illustrated as one example of a reaction force varying means or device for changing a reaction force of the accelerator pedal 2 from the base reaction force. In the illustrated embodiment, the reaction-force changing mechanism 101 includes a variable friction plate 7 having a pair of friction members 7a and 7b arranged facing opposite each other and configured to apply a frictional force against rotation of the rotating shaft 3. One of the friction members 7a is mechanically coupled to an end portion of the rotating shaft 3. The other friction member 7b is non-rotatably supported on a stationary shaft 8 with splines or the like such that it can move freely in an axial direction along the stationary shaft 8. The stationary shaft 8 is fixed to the vehicle body 1. Additionally, the reaction-force changing mechanism 101 includes an actuator 9 (e.g., an electromagnetic solenoid) that is fixed to the vehicle body 1 and serves to apply a force against the friction element 7b toward the friction element 7a.

The variable friction plate 7 is configured such that a frictional force between the friction members 7a and 7b is variable controlled by operating the actuator 9 so as to move the friction member 7b in an axial direction (direction indicated with the arrow A1 in FIG. 1). The operation of the actuator 9 is controlled by a control unit 10, which constitutes a part of the reaction force varying means or device. Basically, the control unit 10 controls the operation of the actuator 9 for controlling a frictional force that is applied to the rotating shaft 3 by the variable friction plate 7. Thus, the reaction force experienced when the accelerator pedal 2 is operated can be varied by the manner in which the control unit 10 controls the operation of the actuator 9.

In addition to receiving an input signal from the accelerator position sensor 6 (which detects a position of the accelerator pedal 2), the control unit 10 also receives input signals from an engine rotational speed sensor 11 and a vehicle speed sensor 12. The engine rotational speed sensor 11 is configured to detect an engine rotational speed Ne. The vehicle speed sensor 12 is configured to detect a vehicle speed VSP.

Figure 3:
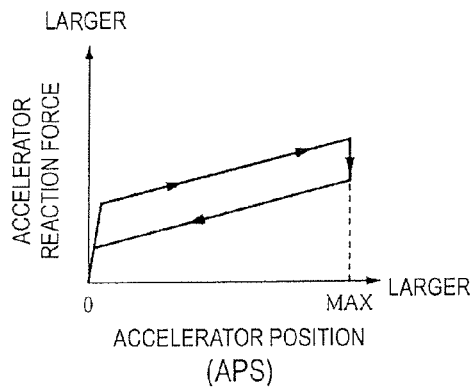
FIG. 3 is a characteristic diagram showing a characteristic of a base reaction force of an accelerator pedal reaction force according to the illustrated embodiments.

FIG. 3 is a simple plot of an accelerator pedal reaction force characteristic according to the embodiment. The accelerator pedal 2 is provided with a basic reaction force that has an appropriate hysteresis with respect to operation of the accelerator pedal 2 in a depression direction (direction of increasing throttle valve opening) and in a release direction (direction of decreasing throttle valve opening). Thus, as indicated in FIG. 3, this diagram shows the basic pedal depression force, i.e., a base reaction force of the accelerator pedal 2 increases substantially proportionally to the accelerator position with the appropriate amount of hysteresis existing between an accelerator position increasing direction and an accelerator position decreasing direction. This basic reaction force is called a "base reaction force" of the accelerator.

The control unit 10 preferably includes a microcomputer with a conventional an engine output control program that controls an engine output of an internal combustion engine. The control unit 10 can also include other conventional components such as an input interface circuit, an output interface circuit, and storage devices such as a ROM (Read Only Memory) device and a RAM (Random Access Memory) device. The microcomputer of the control unit 10 is also programmed to conduct accelerator pedal reaction force control as shown in the flowchart of FIG. 4.

The control unit 10 is configured to set an accelerator position threshold value (APSa in FIG. 6) related to a fuel consumption rate. More specifically, the control unit 10 sets an accelerator position threshold value used when the vehicle changes from an operating region where the fuel consumption rate is low (fuel efficiency is good) to an operating region where the fuel consumption rate is high (fuel efficiency is poor) based on a vehicle or engine operating state and sets an increase cancellation threshold value (APSa' in FIG. 6) to an accelerator position that is smaller than the accelerator position threshold value by a prescribed position amount. When the accelerator position becomes larger than the accelerator position threshold value, the control unit 10 adds a prescribed increase amount to the accelerator pedal reaction force (base reaction force). Conversely, when the accelerator position decrease to the increase cancellation threshold value, the increase of the accelerator pedal reaction force is cancelled.

The accelerator position threshold value is set, for example, in response to the connection and release of a lockup clutch (not shown) in an automatic transmission having a torque converter. As is widely known, a lockup clutch serves as a mechanism to directly connect an input side of a torque converter to an output side of the same. As shown in FIG. 4, the connection and release of the lockup clutch is controlled based on the vehicle speed VSP and the accelerator position APS. The lockup clutch is released when the vehicle is in a non-lockup region (non L/U region) where the vehicle speed is low and the accelerator position APS is large (hatched region in FIG. 4), and connected when the vehicle is in a lockup region (L/U region) where the vehicle speed is high and the accelerator position APS is small. When the lockup clutch is in a released state, the fuel efficiency is comparatively poor in comparison with when the lockup clutch is in a connected state. Therefore, in this embodiment, the non-lockup region is considered to be an operating region in which the fuel efficiency is high (high fuel efficiency operating region) and the lockup region is considered to be an operating region in which the fuel efficiency is low (low fuel efficiency operating region). When the accelerator position APS increases from the lockup region to the non-lockup region, the accelerator pedal reaction force is increased. Thus, the operating state of the lockup clutch constitutes one example of a vehicle or engine operating state that is used as a basis to set the accelerator position threshold value.

Figure 4:
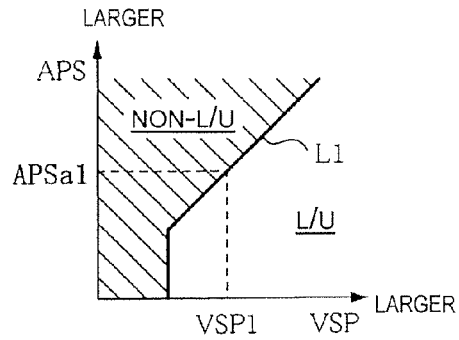
FIG. 4 is a characteristic diagram illustrating a lockup region of a lockup clutch.
Figure 5:
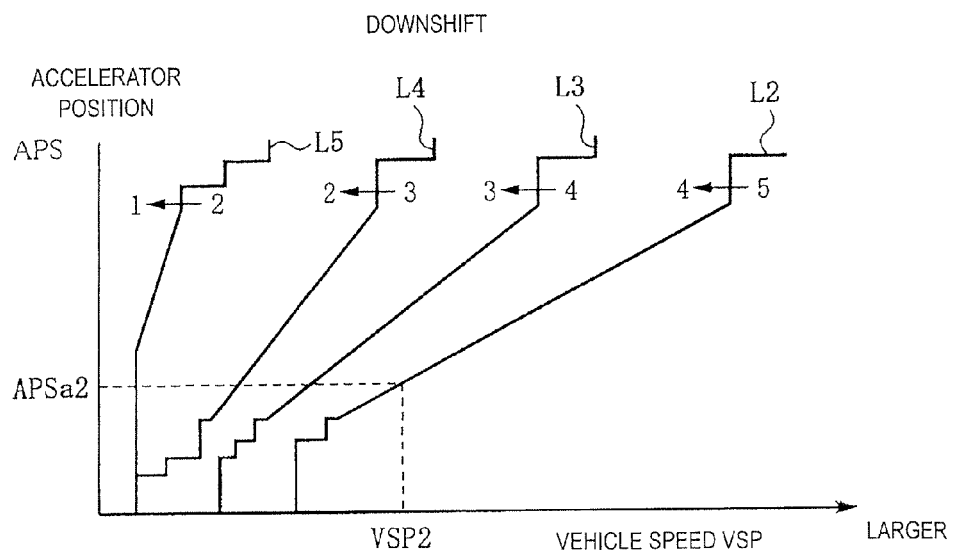
FIG. 5 is a shift diagram illustrating shift lines of an automatic transmission.

In such a situation, the control unit 10 uses the characteristic shown in FIG. 4 to determine if the lockup clutch is in a release state (non-L/U region) or a connected state (L/U region) based on an input vehicle speed VSP and an accelerator position APS. If the lockup clutch is in a connected state (L/U region), then the value of the accelerator position APS corresponding to a vehicle speed VSP received from the vehicle speed sensor 12 on a boundary line L1 of the region shown in FIG. 4 is used as an accelerator position threshold value APSa1 at which the reaction force will be increased. For example, if the vehicle speed is a vehicle speed VSP1, then the corresponding accelerator position APSa1 shown in Figure will be used as the accelerator position threshold value for increasing the reaction force of the accelerator pedal 2. The control unit 10 also sets an increase cancellation threshold value APSa1' that is an accelerator position smaller than the accelerator position threshold value APSa1 by a prescribed position amount. The increase cancellation threshold value APSa1' is an accelerator position threshold value used for cancelling an increase of the reaction force, i.e., decreasing an increased reaction force by the amount of the increase, after the reaction force has been increased due to the accelerator position reaching the accelerator position threshold value APSa1. That is, when the accelerator position has decreased and become equal to or smaller than the increase cancellation threshold value APSa1', the increase of the reaction force is cancelled. The increase cancellation threshold value APSa1' can be set to differ from the accelerator position threshold value APSa1 by a prescribed increase amount or it can be calculated by multiplying the accelerator position threshold value APSa1 by a prescribed coefficient, but the control is not limited to either of these setting methods. It is also possible to set the accelerator position threshold value in response to a downshift (change to a lower gear) of an automatic transmission as shown in FIG. 5. In other words, a downshift operation constitutes one example of a vehicle or engine operating state that is used as a basis to set the accelerator position threshold value.

FIG. 5 is an example of a shift diagram of a five-speed automatic transmission. While the shift control is executed based on the vehicle speed VSP and the accelerator position APS as shown in FIG. 5, since higher gears generally have lower fuel efficiencies, a shift line L2 for shifting from a $5^{th}$ speed to a $4^{th}$ speed is considered to be a boundary line at which the vehicle changes from a region where the fuel efficiency is relatively low to a region where the fuel efficiency is relatively high. Thus, the value of an accelerator position corresponding to a current vehicle speed VSP (e.g., VSP2) and a point on the boundary line L2 is used as an accelerator position threshold value APSa2. Accelerator position threshold values can be set similarly for the shift lines L3 to L5 of the other gears. An increase cancellation threshold value for cancelling the increase of the reaction force, i.e., decreasing the reaction force by an amount equal to the increase, after the reaction force has be increased at the accelerator position threshold value APSa2 is set similarly to the increase cancellation threshold value set in response to the connection and release of the lockup clutch (not shown) of the torque converter type automatic transmission.

Furthermore, instead, the accelerator position threshold value can also be set in response to a fuel increase region where the engine load is high or based on a fuel consumption characteristic of the engine. In other words, a fuel increase region where the engine load is high and/or a fuel consumption characteristic of the engine constitute examples of a vehicle or engine operating state that is used as a basis to set the accelerator position threshold value.

Figure 6:
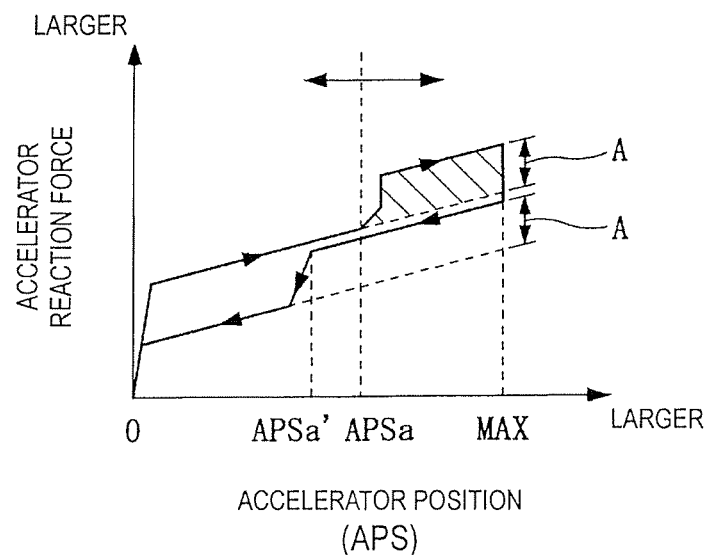
FIG. 6 is a characteristic diagram showing an example of an accelerator pedal reaction force versus accelerator position characteristic of an accelerator reaction force control apparatus according to the illustrated embodiment.

In this embodiment, when the accelerator position APS becomes larger than the accelerator position threshold value APSa and the reaction force of the accelerator pedal 2 is increased beyond a base reaction force by a prescribed increase amount A, the reaction force is not increased in a step-like manner. Instead, as shown in FIG. 6, the reaction force is increased in a continuous fashion with respect to the accelerator position at an increase rate that changes in two stages. More specifically, when the reaction force of the accelerator pedal 2 is increased, the reaction force is increased first at an initial increase rate and then at a second increase rate that is larger than the initial increase rate. In other words, when the reaction force of the accelerator pedal 2 is increased beyond the base reaction force by a prescribed increase amount A, the increase rate is changed at an intermediate stage such that an increase rate at which the reaction force is increased during a second reaction force increase period of the increase is larger than an increase rate at which the reaction force is increased during a first reaction force increase period of the increase.

When the accelerator pedal 2 is in moving in a return direction, i.e., a direction of decreasing accelerator position, the reaction force continues to be increased by the prescribed increase amount A while the accelerator position is larger than the accelerator position threshold value APSa. That is, the reaction force is set to the sum of the prescribed increase amount A and a base reaction force (the base reaction force used when the accelerator position is decreasing is set to have a degree of hysteresis with respect to the base reaction force used when the accelerator position is increasing) until the accelerator position reaches the increase cancellation threshold value APSa'. Then, when the accelerator position has decreased to a value equal to or smaller than the increase cancellation threshold value APSa', the addition of the prescribed value A to the base reaction force is cancelled and the reaction force returns to the base reaction force shown in FIG. 3.

It is acceptable for the prescribed increase amount or value A added to the base reaction force to be a fixed value or a value (reaction force increase amount) that is set to vary depending on various vehicle and/or engine operating conditions.

In the first embodiment, an example of a variable reaction force increase amount is one that is set to be larger when an accelerator position threshold value set based on a vehicle and/or engine operating state. Specifically, the control unit 10 of the accelerator reaction force control apparatus 100 controls the actuator 9 so as to increase a reaction force of the accelerator pedal 2 by a prescribed increase amount A beyond a base reaction force when an accelerator position becomes larger than an accelerator position threshold value. The accelerator reaction force control apparatus 100 is characterized by the control unit 10 varying an increase rate at which the reaction force of the accelerator pedal 2 is increased beyond the base reaction force such that when the reaction force is increased, an increase rate at which the reaction force is increased during a second reaction force increase period of the increase is larger than an increase rate at which the reaction force is increased during a first reaction force increase period of the increase. As a result, even when conditions are such that the base reaction force is large, unambiguous information can be conveyed to the driver. The control unit 10 constitutes one example of a threshold value setting means or device of the accelerator reaction force control apparatus 100.

Figure 7:
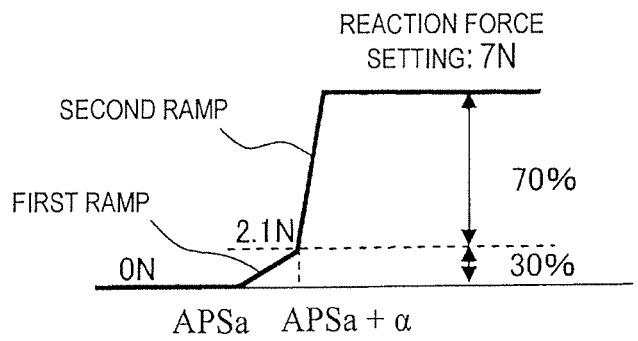
FIG. 7 is a characteristic diagram showing a correlation of a reaction force increase amount with respect to an accelerator position and a base reaction force in a first embodiment.

As seen in FIG. 7, in the first embodiment, when a prescribed increase amount A of 7 N is added to a base reaction force of the accelerator pedal 2, the reaction force of the accelerator pedal 2 is increased at an initial (first) reaction force increase rate (first ramp) until the amount of increase (first prescribed increase amount) with respect to the base reaction force reaches 30% of the prescribed increase amount A. Thereafter, the reaction force of the accelerator pedal 2 is increased at a second reaction force increase rate (second ramp) until the amount of increase (second prescribed increase amount) with respect to the base reaction force reaches the prescribed increase amount A. In other words, when a prescribed increase amount A of 7 N is added to a base reaction force of the accelerator pedal 2, the reaction force of the accelerator pedal 2 is increased at the first reaction force increase rate (first ramp) until the accelerator position reaches a prescribed position (APSa+α) that is larger than the accelerator position threshold value APSa by an amount α. Thereafter, the reaction force of the accelerator pedal 2 is increased at a second increase rate (second ramp) until the amount of increase with respect to the base reaction force reaches the prescribed increase amount A.

The first prescribed increase amount by which the reaction force can be increased at the first increase rate and the second prescribed increase amount by which the reaction force can be increased at the second increase rate are determined as a proportional distribution based on the prescribed increase amount A. In the first embodiment, the first prescribed increase amount by which the reaction force can be increased at the first increase rate is 30% of the prescribed increase amount A and the second prescribed increase amount by which the reaction force can be increased at the second increase rate is 70% of the prescribed increase amount A. This proportional distribution is not limited to 3:7 and can be changed as appropriate. In the first embodiment, the first increase rate (first ramp) is set such that the reaction force increases beyond the base reaction force at a rate pf 0.2 N per 0.1 degree increase of the accelerator position, while the second increase rate (second ramp) is set such that the reaction force increases beyond the base reaction force at a rate pf 0.5 N per 0.1 degree increase of the accelerator position. In this way, the reaction force of the accelerator pedal 2 is increased gradually during an initial increase period and more rapidly during a second increase period.

Figure 8:
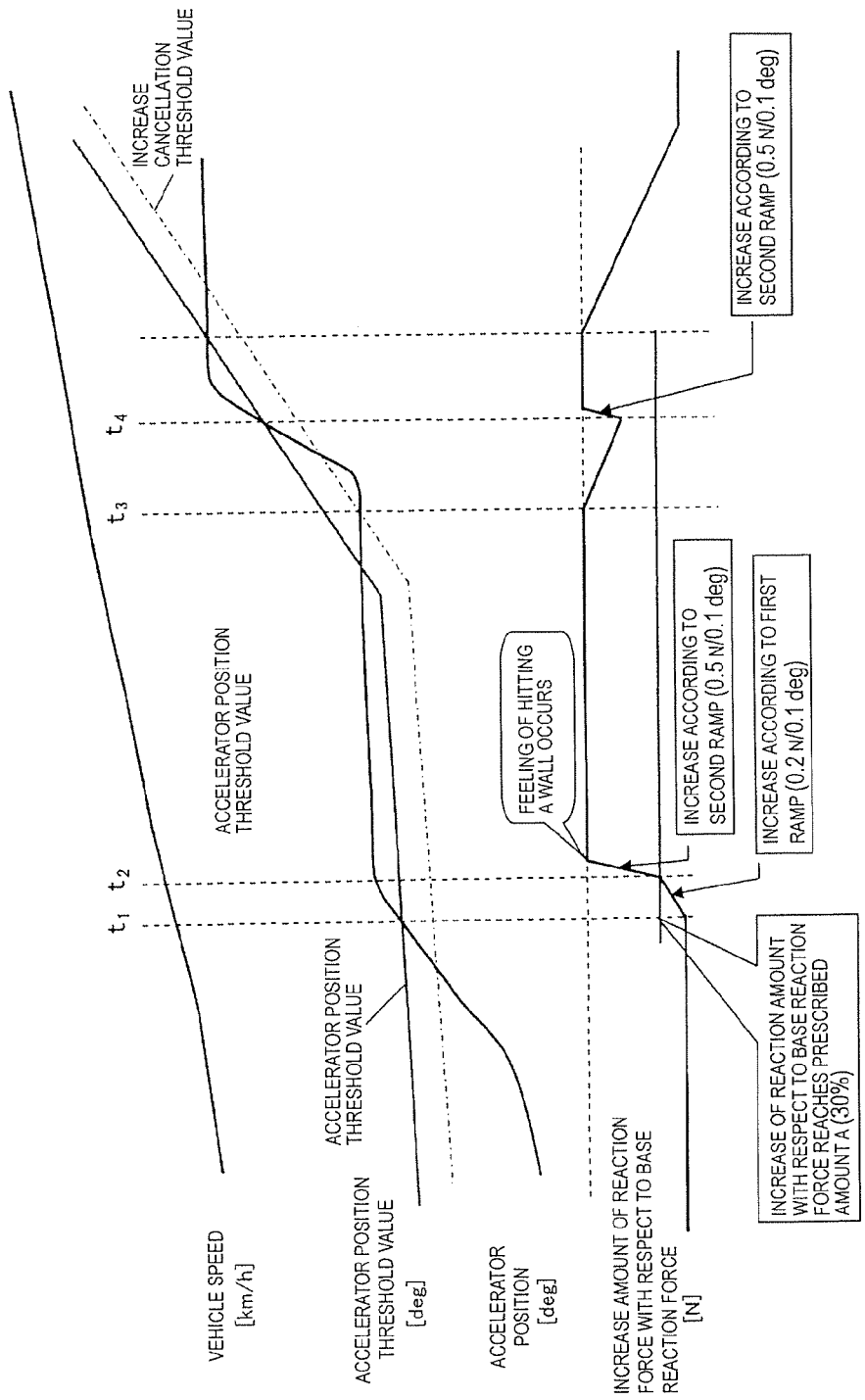
FIG. 8 is a time chart illustrating various parameters in the first embodiment.

FIG. 8 is a time chart showing how various parameters behave when the accelerator position APS becomes larger than the accelerator position threshold value APSa in the first embodiment. When the accelerator position becomes larger than the accelerator position threshold value APSa (at a time t1 in FIG. 8), the reaction force is increased with respect to the base reaction force at the first increase rate (first ramp) of 0.2 N per 0.1 degree. When the amount by which the reaction force has been increased at the first increase rate (first ramp) reaches 30% of the prescribed increase amount A (at a time t2 in FIG. 8), the reaction force is then increased at the second increase rate (second ramp) of 0.5 N per 0.1 degree until it is larger than the base reaction force by the prescribed increase amount A (7 N in the first embodiment). If the accelerator position decreases to a value smaller than the increase cancellation threshold value APSa' after having been constant or increasing so as to become larger than the accelerator position threshold value APSa (at a time t3 in FIG. 8), then the reaction force is decreased by an amount equal to the increase amount beyond the base reaction force at a prescribed decease rate. If the accelerator position becomes larger than the accelerator position threshold value APSa while the reaction force is being decreased at a prescribed decrease rate from the reaction force obtained by adding an increase amount to the base reaction force (at a time t4 in FIG. 8), then the reaction force is increased at a prescribed reaction force increase rate until it is larger than the base reaction force by the prescribed increase amount A. In this embodiment, the reaction force is increased at the same increase rate (0.5 N per 0.1 degree) as the second increase rate (second ramp).

In this embodiment, when the accelerator position exceeds the accelerator position threshold value APSa while the increase amount of the reaction force with respect to the base reaction force is equal to or smaller than 30% of the prescribed increase amount A, i.e., 2.1 N, the reaction force is increased to the prescribed increase amount A beyond the base reaction force at the same increase rate as a situation in which the accelerator position exceeds the accelerator position threshold value APSa before the increase amount of the reaction force with respect to the base reaction force decreases to 30% of the prescribed increase amount A, i.e., 2.1 N.

Figure 9:
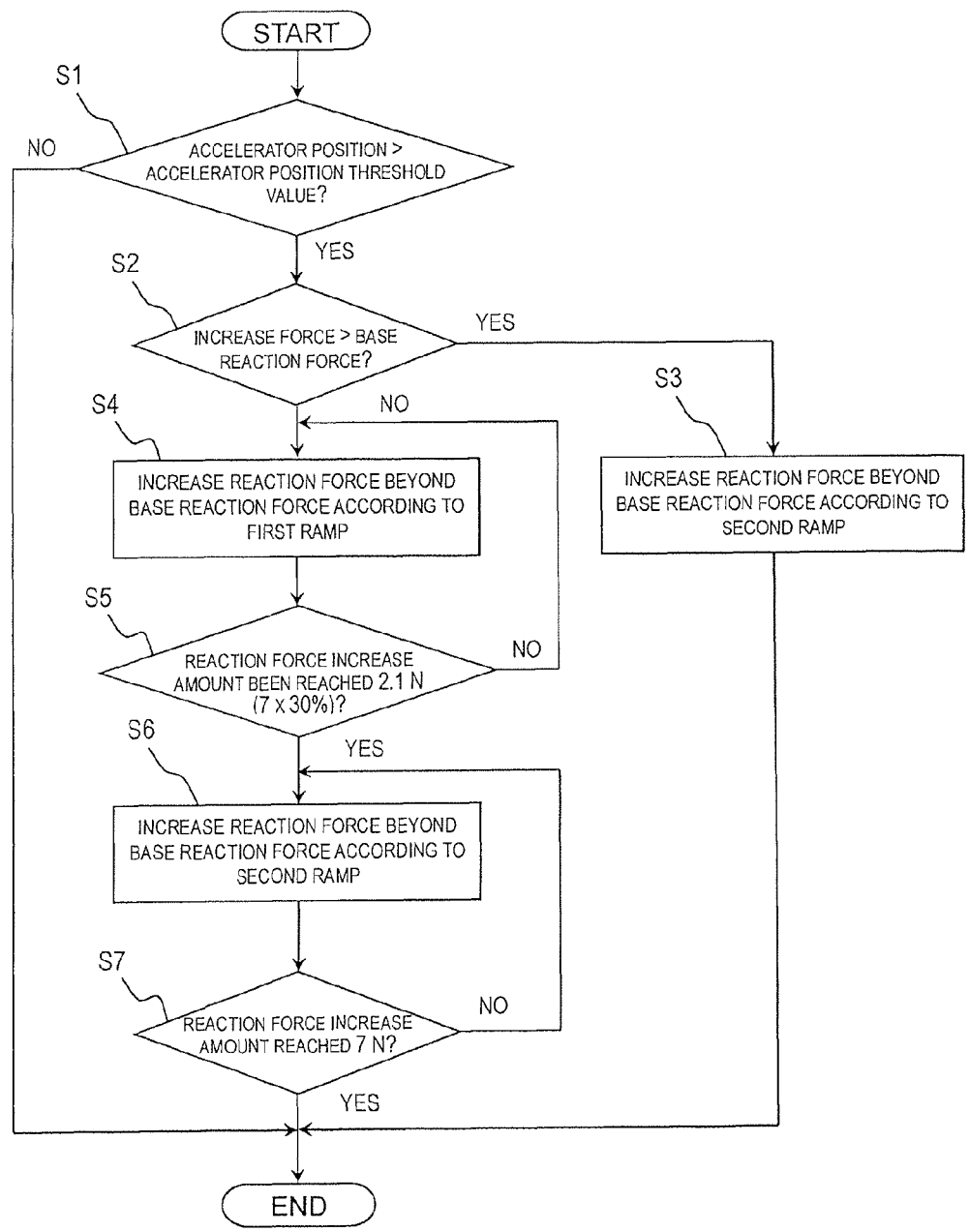
FIG. 9 is a flowchart illustrating processing steps executed by a reaction force control of a control unit according to the first embodiment.

FIG. 9 is a flowchart showing flow of control steps according to the first embodiment.

In step S1, the control unit 10 determines if the accelerator position is larger than an accelerator position threshold value and, if so, proceeds to step S2.

In step S2, the control unit 10 determines if the reaction force of the accelerator pedal 2 is larger than the base reaction force. If so, the control unit 10 determines that the accelerator position exceeded the accelerator position threshold value APSa while the increase amount of the reaction force added to the base reaction force was being decreased at a prescribed decrease rate and proceeds to step S3. Otherwise, the control unit 10 determines that the accelerator position exceeded the accelerator position threshold value APSa while the reaction force was not being increased with respect to the base reaction force and proceeds to step S4.

In step S3, the control unit 10 increases the reaction force at the second reaction force increasing rate (second ramp) until the increase amount of the reaction force with respect to the base reaction force reaches 7 N.

In step S4, the control unit 10 increases the reaction force at the first increase rate (first ramp) with respect to the base reaction force.

In step S5, the control unit 10 determines if the reaction force increase amount has reached 30% of the prescribed increase amount A (7 N). If the increase amount has reached 30% of the prescribed increase amount A, then the control unit 10 proceeds to step S6. If not, then the control unit 10 proceeds to step S4.

In step S6, the reaction force is increased at the second increase rate (second ramp).

In step S7, the control unit 10 determines if the increase amount of the reaction force has reached the prescribed increase amount A (7N). If the increase amount has not reached the prescribed increase amount A, then the control unit 10 proceeds to step S6.

In the first embodiment, since the first increase rate (first ramp) used to increase the reaction force of the accelerator pedal 2 beyond the base reaction force is set to be smaller than the second increase rate (second ramp), accelerator pedal 2 is less likely to fling the driver's foot back and behave erratically against the intent of the driver, thus causing the driver to experience a feeling that something is odd about the vehicle. Moreover, degradation of the operability is also suppressed. Also, since the second increase rate at which the reaction force is increased is larger than the initial increase rate, the driver can be reliably notified that the fuel efficiency will decline.

Since the increase rate at which the reaction force is increased during a second reaction force increase period of the increase is larger than the increase rate at which the reaction force is increased during a first reaction force increase period of the increase, when the reaction force of the accelerator pedal 2 is increased beyond the base reaction force, flinging back of the driver's foot is suppressed and the driver can be reliably notified that the fuel efficiency will decline.

In this embodiment, the amount by which the reaction force can be increased at the first increase rate (first ramp) and the amount by which the reaction force can be increased at the second increase rate (second ramp) are determined as a proportional distribution based on a prescribed reaction force increase amount added to the base reaction force when the accelerator position becomes larger than the accelerator position threshold value. This is the case even if the reaction force increase amount added to the base reaction force of the accelerator pedal 2 when the accelerator position becomes larger than the accelerator position threshold value is varied (e.g., varied based on the accelerator position threshold value, which is set based on an operating condition, such that as the accelerator position threshold value becomes larger, the reaction force increase amount is set to a larger value). As a result, it can be ensured that the driver will readily notice that the resistance to depression of the accelerator pedal 2 has changed.

Additionally, since the amount by which the reaction force is increased using the second increase rate is larger than the amount by which the reaction force is increased using the first increase rate, a tendency of the accelerator pedal 2 to fling the driver's foot back and behave erratically against the intent of the driver can be suppressed and the driver can be reliably notified that the fuel efficiency will decline.

Although in the first embodiment the reaction force of the accelerator pedal 2 is increased at the first increase rate (first ramp) from a point when the accelerator position becomes larger than the accelerator position threshold value APSa until the accelerator position reaches a prescribed position, it is also acceptable to contrive the control such that the reaction force of the accelerator pedal 2 is increased at the first increase rate (first ramp) from a point when the accelerator position becomes larger than the accelerator position threshold value APSa until a prescribed increase amount of time has elapsed.

Figure 10:
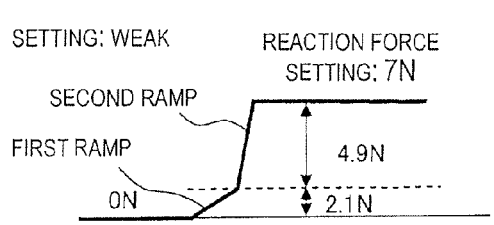
FIG. 10 shows a correlation of a reaction force increase amount with respect to an accelerator position and a base reaction force according to a second embodiment in which a weak reaction force increase setting is used.
Figure 11:
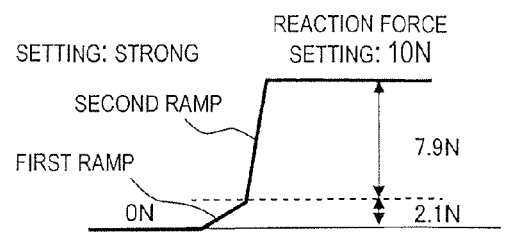
FIG. 11 shows a correlation of a reaction force increase amount with respect to an accelerator position and a base reaction force according to the second embodiment in which a strong reaction force increase setting is used.

Referring now to FIGS. 10 and 11, in the second embodiment, the control unit 10 is configured such that the amount by which the reaction force is increased when the accelerator position becomes larger than the accelerator position threshold value APSa can be selected between two value levels, 7 N and 10 N. A driver can accomplish this "strong" or "weak" setting by, for example, operating a switch 20 (e.g., a reaction force increase amount selecting device) installed on an instrument panel inside the vehicle. In the second embodiment, the increase amount by which the reaction force can be increased at the first increase rate when the accelerator position becomes larger than the accelerator position threshold value APSa is 2.1 N regardless of whether the reaction force increase amount with respect to the base depression amount is set to the weak value of 7 N or the strong value of 10 N. Meanwhile, the amount by which the reaction force can be increased at the second increase rate is set to 4.9 N if the weak setting is selected and 7.9 N if the strong setting is selected.

The second embodiment achieves the same operational effects as the first embodiment. Additionally, since the initial reaction force increase amount is not varied, the second embodiment can reduce the computational load of the control unit 10 in comparison with a configuration in which the increase amount by which the reaction force can be increased at the first increase rate is varied in accordance with whether the weak setting or the strong setting is selected for the reaction force increase amount with respect to the base depression amount.

With the second embodiment, the apparatus can also be configured such that the amount by which the reaction force is increased when the accelerator position becomes larger than the accelerator position threshold value APSa can be selected between more than two levels (e.g., three levels including a strong, a medium, and a weak level).

In the embodiments explained heretofore, when the reaction force of the accelerator pedal 2 is increased by the prescribed increase amount A beyond the base reaction force, the rate at which the reaction force is increased with respect to the accelerator position is changed in two stages. However, it is acceptable to change the rate at which the reaction force is increased with respect to the accelerator position in multiple stages successively.

It is also acceptable to set the reaction force increase amount added to the base reaction force such that it increases, for example, according to a second degree curve with respect to an increase of the accelerator position. In this way, too, the reaction force can be increased such that the rate at which the reaction force is increased is larger during a second reaction force increase period of the increase than during a first reaction force increase period.

In the embodiments explained heretofore, the increase rate of the reaction force is set according to the accelerator position such that the reaction force increase amount added to the base reaction force is set each time the accelerator position increases by a prescribed increase amount. However, the invention is not limited to such a control scheme and it is acceptable to set the reaction force increase amount added to the base reaction force each time a prescribed increase amount of time elapses.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An accelerator reaction force control apparatus comprising:
    an accelerator position detecting device that detects an accelerator position;
    a reaction force varying device that varies a reaction force of the accelerator so as to increase a reaction force of the accelerator by a prescribed increase amount with respect to a base reaction force when the accelerator position is equal to or larger than an accelerator position threshold value, the reaction force increasing at a base reaction force increase rate of the base reaction force when the accelerator position is less than the accelerator position threshold value; and
    a threshold value setting device that sets the accelerator position threshold value based on at least one of a vehicle operating state and an engine operating state related to a fuel consumption rate,
    the reaction force varying device being further configured to vary a reaction force increase rate at which the reaction force of the accelerator is increased by the prescribed increase amount beyond the base reaction force, the reaction force increase rate including a first increase rate that is used during a first reaction force increase period of the increase of the reaction force and a second increase rate that is used during a second reaction force increase period of the increase of the reaction force, with the second reaction force increase period being subsequent to the first reaction force increase period, the second increase rate during the second reaction force increase period being larger than the first increase rate during the first reaction force increase rate period, and the first increase rate being larger than the base reaction force increase rate.

2. The accelerator reaction force control apparatus as recited in claim 1, wherein
    the reaction force varying device is configured to vary the reaction force increase rate when the accelerator position has increased by a prescribed position amount since the accelerator position became larger than the accelerator position threshold value.

3. The accelerator reaction force control apparatus as recited in claim 1, wherein
    the reaction force varying device is configured to vary the reaction force increase rate when a prescribed increase amount of time has elapsed since the accelerator position became larger than the accelerator position threshold value.

4. The accelerator reaction force control apparatus as recited in claim 1, wherein
    the reaction force varying device is further configured to increase the reaction force using a first increase amount in the first reaction force increase period and a second increase amount in the second reaction force increase period such that the second increase amount by which the reaction force is increased at the second increase rate used in the second reaction force increase period is larger than the first increase amount by which the reaction force is increased at the first increase rate used in the first reaction force increase period.

* * * * *